United States Patent [19]

Murakami et al.

[11] Patent Number: 4,658,373
[45] Date of Patent: Apr. 14, 1987

[54] POSITION DETECTING APPARATUS

[75] Inventors: Azuma Murakami, Tokyo; Yoshinori Taguchi, Ageo, both of Japan

[73] Assignee: Wacom Co., Ltd., Kaitama, Japan

[21] Appl. No.: 638,000

[22] Filed: Aug. 6, 1984

[30] Foreign Application Priority Data

Aug. 5, 1983 [JP] Japan .................................. 58-144227

[51] Int. Cl.⁴ ............................................. H03K 13/02
[52] U.S. Cl. ..................................... 364/559; 364/449; 178/19
[58] Field of Search ....................... 364/559, 443, 449; 178/19

[56] References Cited

U.S. PATENT DOCUMENTS

| 3,846,580 | 11/1974 | Brenner | 178/19 |
| 4,136,558 | 1/1979 | Lukes et al. | 364/559 X |
| 4,216,352 | 8/1980 | Chamuel | 178/19 |
| 4,273,954 | 6/1981 | Takeuchi et al. | 178/19 |
| 4,497,034 | 1/1985 | Kuno et al. | 364/559 X |

FOREIGN PATENT DOCUMENTS 2069783 8/1981 United Kingdom ................. 364/559

Primary Examiner—Edward J. Wise
Attorney, Agent, or Firm—Pollock, Vande Sande & Priddy

[57] ABSTRACT

A position detecting apparatus has a matrix-like arrangement constituted by a plurality of substantially parallel X-direction magnetrostrictive line bundles, each of the bundles having at least one magnetostrictive transmission medium element, and a plurality of substantially parallel Y-direction magnetostrictive line bundles, each of the bundles having at least one magnetostrictive transmission medium element, the Y-direction magnetostrictive line bundles crossing the X-direction magnetrostrictive line bundles substantially at a right angle. First coils are wound commonly around one end of the X-direction magnetostrictive line bundles and Y-direction magnetostrictive line bundles, respectively. Second coils have portions wound around the X-direction magnetostrictive line bundles over a large length thereof and the portions wound around the Y-direction magnetostrictive line bundles over a large length thereof. The first and second coils in respective directions make signal exchange therebetween through the magnetostrictive transmission medium. The electromechanical coupling coefficient of the magnetostrictive transmission medium is changed only a portion thereof by means of the position appointing magnetism generator, and this position is detected through the detection of a change in the signal receiving timing caused by the change of the electromagnetic coupling coefficient. The magnetism generator is not connected to any stationary part. The detection can be made within the position detection region with a high resolution even when the position appointing magnetism generator is spaced considerably from the apparatus in the vertical direction. The apparatus, therefore, can be applied to a system for automatically detecting the position of a moving body, by attaching the position appointing magnetism generator to such a moving body.

6 Claims, 31 Drawing Figures (a)  (b)

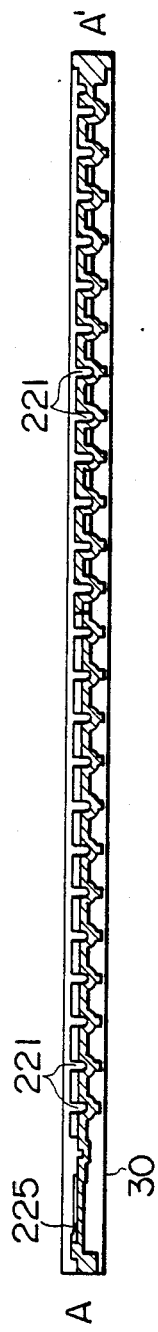
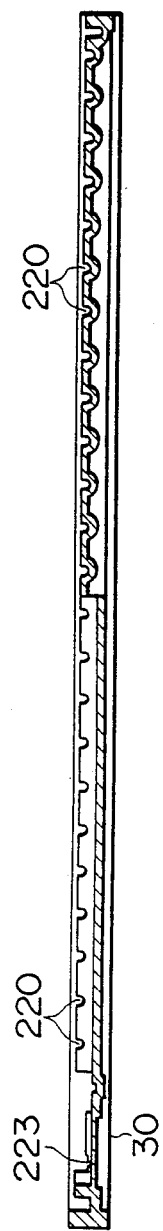
FIG. 22 (b)
FIG. 22 (c)

POSITION DETECTING APPARATUS

BACKGROUND OF THE INVENTION

1. Field of the Invention

The present invention relates to an apparatus for detecting a position appointed by a position appointing magnetism generator. More particularly, the invention is concerned with a position detecting apparatus of the type mentioned above, capable of detecting the appointed position by making use of a magnetostrictive vibration wave which is propagated through a magnetostrictive transmission medium, without requiring any exchange of timing signal between the apparatus and the magnetism generator.

2. Description of the Prior Art

A typical example of the position detecting apparatus of the kind described is shown in, for example, Japanese Patent Publication No. 32668/1981. In this known apparatus, an instantaneous change of magnetic field is generated by a position appointing magnetism generator and is propagated in the form of magnetostrictive vibration wave through a magnetostrictive transmission medium to reach a detecting coil disposed at the distal end of the medium. The position appointed by the position appointing magnetism generator is detected by measuring and processing with a processing unit the length of time from the moment at which the instantaneous change in magnetic field is generated until the moment at which the magnetostrictive vibration wave is detected by the detecting coil. In this known apparatus, therefore, it is necessary to connect the position appointing magnetism generator to the processing unit through a signal line, in order to inform the processing unit of the timing at which the instantaneous change in the magnetic field is generated. Consequently, the mobility, as well as the handling, of the position appointing magnetism generator is restricted undesirably. For this reason, the known position detecting apparatus has been able to find only limited use.

This problem is serious particularly when the detection of position has to be made over a planar surface because in such a case the position appointing magnetism generator has to move over a wide area.

SUMMARY OF THE INVENTION

Accordingly, it is a primary object of the invention to provide a position detecting apparatus, wherein a plurality of parallelmagnetostrictive line bundles, each consisting of at least one magnetostrictive transmission medium element, are arranged to extend in X- and Y-directions so as to intersect substantially at a right angle, and first and second coils are wound around at least one magnetostrictive transmission medium so that signals are exchanged between these coils through the intermediary of the magnetostrictive transmission medium. With this arrangement, it becomes unnecessary to connect the position appointing magnetism generator to any fixed portion of the apparatus so that the position appointing magnetism generator can be moved freely without being limited by signal wire or other parts, whereby the mobility and the handling of the apparatus are very much improved.

It is a second object of the invention to provide a position detecting apparatus capable of detecting the appointed position in X- and Y-directions, by making use of two groups of magnetostrictive line bundles arrayed in the X- and Y-directions.

It is a third object of the invention to provide a position detecting apparatus which does not require the troublesome work of maintaining magnetism in the magnetostrictive transmission medium, e.g., periodical rubbing of the medium with a magnet bar, which is essential in the conventional coordinate position detecting apparatus of magnetorestriction type. This object can be accomplished by appointing a position through a local change of the electro-mechanical coupling coefficient of a magnetostrictive transmission medium effected by the position appointing magnetism generator.

It is a fourth object of the invention to provide a position detecting apparatus which can detect the appointed position at a high resolution even when the position appointing generator is held above the transmission medium surface by a substantial distance of several centimeters or greater. To this end, the invention proposes to make use of the fact that the electro-mechanical coupling coefficient of the magnetostrictive transmission medium is saturated at a level of several Oe (oersted).

It is a fifth object of the invention to provide a position detecting apparatus having an increased area of position detection. To achieve this problem, the invention proposes to wind the second coils around the magnetostrictive line bundles in the same direction and to connect them in series, and a plurality of biasing magnetic bodies for applying a bias to the portion of the magnetic line bundles surrounded by the first coil. The portion of the second coil associated with almost a half of the magnetostrictive line bundles has a polarity opposite to the portion of the second coil surrounding the other half part of the magnetostrictive line bundles. Similarly, the biasing magnetic bodies for applying magnetic bias to the portion of a half-part of the magnetostrictive line bundles have a polarity opposite that of the biasing magnetic bodies for applying the magnetic bias to the other half part of the magnetostrictive line bundles. By so doing, it is possible to reduce the voltage produced by the electromagnetic induction between the first and second coils. Consequently, the distance between the first and second coils can be decreased to permit an increase of the position detectable area.

The above and other objects, features and advantages of the invention will become clear from the following description of the preferred embodiments when the same is read in conjunction with the accompanying drawings.

DESCRIPTION OF THE PREFERRED EMBODIMENTS

Figure 1:
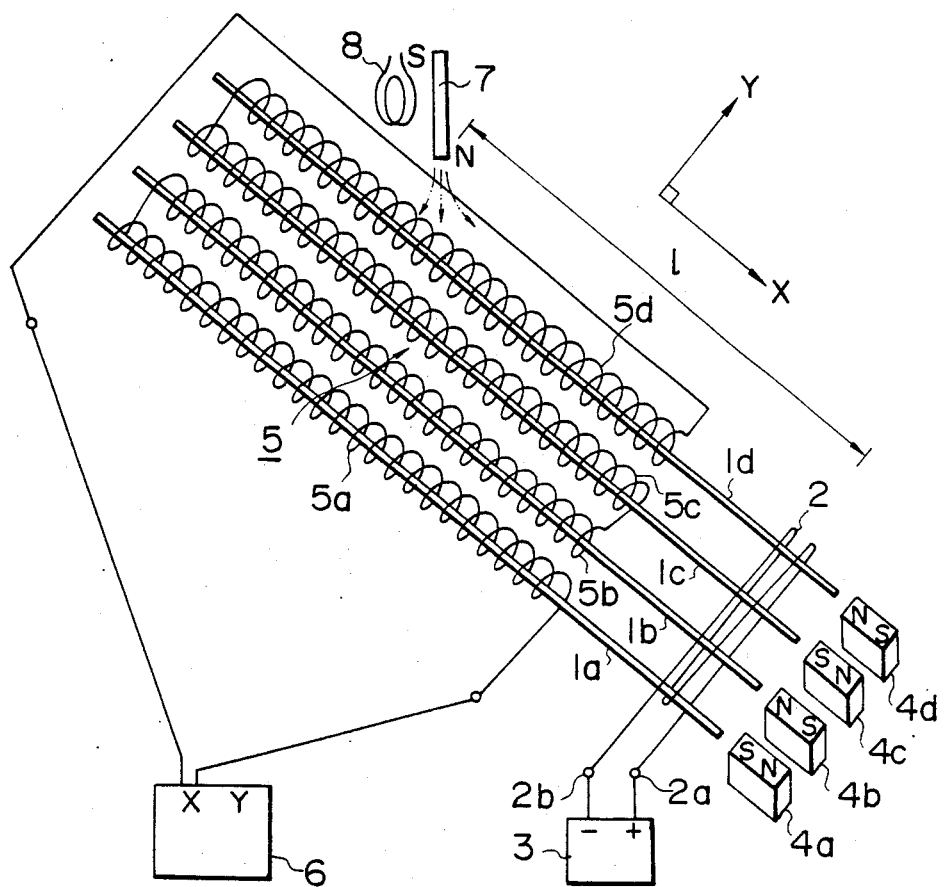
FIG. 1 is an illustration of an X-direction position detecting section in an embodiment of the invention.

Before turning to the description of the preferred embodiments, the principle of the invention will be explained to facilitate understanding of the invention.

When the magnetostrictive vibration wave is propagated through a magnetostrictive transmission medium, a part of the mechanical vibration energy is changed into magnetic energy such as to produce a local change in the magnetic field at the position where the magnetostrictive vibration wave exists. The magnitude of the change in the magnetic field is proportional to a coefficient (referred to as "electro-mechanical coupling coefficient") which represents the coefficient of conversion from mechanical energy into electric energy or vice versa. The electro-magnetic coefficient takes its maximum value at a certain level of intensity of the biasing magnetic field.

It is assumed here that a magnetostrictive transmission medium is surrounded by a coil over its entire length by a coil, and that a magnetic bias of a level which causes a local increase of the electro-mechanical coupling coefficient is applied by a position appointing magnetism generator only to a preselected portion of the medium. In such an arrangement, a large change in the magnetic field is caused when the wave of magnetostrictive vibration has reached the portion under the magnetic bias, so that a large electromotive force is induced in the coil by the magnetostrictive vibration. By detecting the timing of generation of this large electromotive force, it is possible to know the length of time which it will take for the magnetostrictive vibration wave to reach the position appointed by the position appointing magnetism generator. The appointed position is identified by processing this time length.

The electro-mechanical coupling coefficient also determines the magnitude of the magnetostrictive vibration wave generated in the magnetostrictive transmission medium by the instantaneous change in the magnetic field intensity. Namely, the greater the coupling coefficient is, the larger the magnitude of the magnetostrictive vibration becomes. Therefore, if a magnetic bias of a level which causes an increase in the electro-mechanical coupling coefficient is applied by the position appointing magnetism generator to a magnetostrictive transmission medium surrounded by a coil over its entire length, a large magnetostrictive vibration is caused locally only at the appointed position, when a pulse voltage is applied to the coil. Assuming here that another coil is provided at the distal end of the magnetostrictive transmission medium, a large electromotive force is produced in this coil when it is reached by the large magnetostrictive vibration wave. By detecting the timing of generation of the electromotive force, it is possible to detect the appointed position for the same reason as that explained above.

The apparatus of the invention is able to detect the position appointed by the position appointing magnetism generator by making effective use of the theory described hereinabove, as will be understood from the following description of the preferred embodiments.

Referring first to FIG. 1 schematically showing the construction of an X-direction position detecting section of an embodiment of the invention, a plurality of magnetostrictive transmission mediums 1a to 1d are made from a material having a magnetostrictive effect. Although any type of ferromagnetic material can be used as the material of this medium, materials having large magnetostrictive effect such as amorphous alloys rich in Fe are preferably used in order to produce a strong magnetostrictive vibration wave. It is also preferred that the material of the magnetostrictive transmission medium has a small coercive force so that the medium will not be magnetized easily due to accidentally caused influence from a magnet. Examples of amorphous alloys which can be preferably used are $Fe_{67}Co_{18}B_{14}Si_1$ (atomic %) and $Fe_{81}B_{13.5}Si_{13.5}C_2$ (atomic %). Each of the magnetostrictive transmission medium elements 1a to 1d can have an elongated web-like form having a thin rectangular cross-section or an elongated linear form with a circular cross-section. When the magnetostrictive transmission medium elements 1a to 1d have a web-like form, the thickness of this medium preferably ranges between several um and several tens of um, while the width is selected preferably on the order of several millimeters. As is well known, amorphous alloys can be produced rather easily in the form of a thin ribbon. The magnetostrictive transmission medium in the thin web-like form with a rectangular cross-section or in a linear form with a cylindrical cross-section can be obtained by suitably cutting the ribbon of the amorphous alloy.

The illustrated embodiment employs magnetostrictive transmission medium elements of 2 mm wide and 0.02 mm thick, made of $Fe_{81}B_{13.5}Si_{13.5}C_2$ (atomic %).

A reference numeral 2 denotes an X-direction first coil which is wound around an end of the magnetostrictive transmission medium elements 1a to 1d. Although the number of turns of the coil 2 is 2 (two) in the illustrated embodiment, the number may be 1 (one) or 3 (three) or greater. The first coil 2 has the function of producing an instantaneous change in the magnetic field in the direction perpendicular to the plane of the coil thereby causing a magnetostrictive vibration wave in the portion of the magnetostrictive transmission medium elements 1a to 1d surrounded by the coil 2. The coil 2 is connected at its one end 2a to the + (plus) terminal of a pulse current generator 3 which is capable of producing a pulse current strong enough to cause the magnetostrictive vibration wave, while the other end 2b of the same is connected to the minus (−) terminal thereof.

Figure 2:
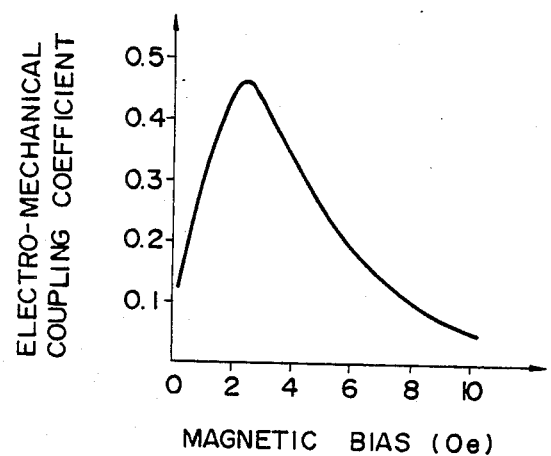
FIG. 2 is a graph showing how the electro-mechanical coupling coefficient is changed in relation to the magnetic bias.

Biasing magnetic bodies 4a to 4d are adapted to apply a biasing magnetic field in the direction parallel to the longitudinal axis of the magnetostrictive transmission medium elements 1a to 1d to the portion of the latter around which the first coil 2 is wound. This biasing magnetic field is applied for the purpose of enabling generation of a magnetostrictive vibration wave with a comparatively small electric current. Since the electromechanical coupling coefficient is maximized at a certain level of the biasing magnetic field as shown in FIG. 2, the efficiency of generation of the magnetostrictive vibration wave can be increased by applying a biasing magnetic field of such a level. The biasing magnetic bodies 4a to 4d may be omitted if a small amount of electric power consumption is permissible.

For a reason which will be explained later, the biasing magnetic bodies 4a and 4c have reverse polarity to the biasing magnetic bodies 4b and 4d.

Referring again to FIG. 1, coils 5a to 5d are wound around the magnetostrictive transmission medium elements 1a to 1d. These coils 5a to 5d have the function of detecting the voltage produced by the magnetostrictive vibration wave propagated through the magnetostrictive transmission medium elements 1a to 1d. These coils 5a to 5d, therefore, are wound over a considerable length of the magnetostrictive transmission medium elements. The length or range of the medium elements covered by the coils 5a to 5d is the range within which the appointed position is detectable. In order to obtain a greater electromotive force, the coils 5a to 5d preferably have a large coil pitch. For instance, this embodiment has a pitch of 7 turns/cm.

The coils 5a to 5d have an identical direction of winding which is in this case counterclockwise. Coils 5a and 5b are connected at their terminal ends, while coils 5b and 5c are connected at their starting ends. Coils 5c and 5d are connected at their terminal ends. The starting ends of the coils 5a and 5d are connected to the X-direction input terminal of the processing unit 6. Thus, in this arrangement, the coils 5a to 5d are connected in series such that adjacent coils exhibit reverse polarities. The coils 5a to 5d in combination constitute an X-direction second coil 5.

In the illustrated embodiment, the position appointing magnetism generator is constituted by a cylindrical bar magnet 7 having a diameter of 3 mm and a length of 50 mm. Thus, the embodiment under description detects the position which is appointed by the bar magnet 7. A reference numeral 8 denotes an antenna coil for informing the starting of the measurement. It is assumed here that the position appointing bar magnet 7 is positioned at a distance from the center of the plane of the X-direction first coil 2, with its N-pole directed downwardly, so as to apply to the opposing portion of the magnetostrictive transmission medium elements 1a a magnetism of a level which can increase the electro-mechanical coupling coefficient.

In this state, as the pulse current from the X-direction pulse current generator 3 is applied to the X-direction first coil 2, the coil 2 generates an instantaneous change of magnetic field which in turn produces a magnetostrictive vibration wave in the portion of the magnetostrictive medium elements 1a to 1d around which the coil 2 is wound. This magnetostrictive vibration wave is propagated through the magnetostrictive transmission medium elements 1a to 1d along the length of the latter at a propagation speed (about 5,000 m/sec) peculiar to the material of the magnetostrictive transmission medium elements 1a to 1d. During the propagation of the magnetostrictive vibration wave, a conversion from mechanical energy into magnetic energy is effected at every moment in the portion of the magnetostrictive transmission medium elements 1a to 1d where the magnetostrictive vibration wave exists, so that an electromotive force is generated in the X-direction second coil 5.

Figure 3:
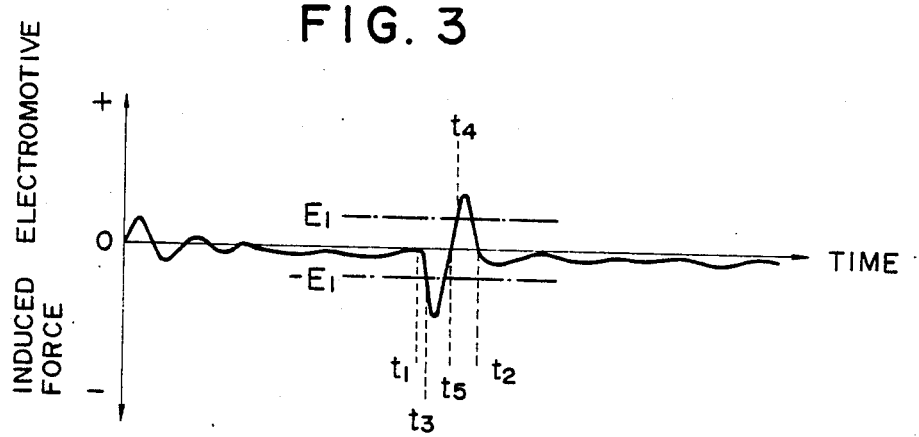
FIG. 3 is a diagram showing how the electromotive force induced in an X-direction second coil 5 is changed in relation to time.

FIG. 3 shows an example of the change of electromotive force generated in the X-direction second coil 5 in relation to time. In this figure, $t_0$ represents the moment at which the pulse current is applied to the X-direction first coil 2. As will be seen from this figure, the amplitude of the electromotive force induced in the X-direction second coil 5 shows peaks during a short period immediately after the moment $t_0$ and a short period which is $t_1$ to $t_2$ seconds after the moment $t_0$, but is small in other periods. The peak of the amplitude of electromotive force appearing immediately after the moment $t_0$ is attributable to the electromagnetic induction between the X-direction first coil 2 and the X-direction second coil 5, while the peak of the electromotive force (voltage induced by magnetostrictive vibration wave) observed in the period between the moments $t_1$ and $t_2$ is caused by an increase in the electro-mechanical coupling coefficient in the position just beneath the position appointing bar magnet 7, as a result of the arrival at this position of the magnetostrictive vibration wave generated in the portion of the magnetostrictive transmission medium element 1a surrounded by the X-direction second coil. It will be seen that the movement of the position appointing bar magnet 7 in the longitudinal direction of the magnetostrictive bar magnet 7 causes a movement of the second peak of the induced voltage along the time axis in FIG. 3. It is, therefore, possible to detect the position appointed by the position appointing bar magnet 7, i.e., the distance l, by measuring the time length between the moment $t_0$ and the moments $t_1$–$t_2$. The propagation time as the index of the position may be measured by detecting, for example, the moment $t_3$ at which the amplitude of the voltage induced by the magnetostrictive vibration has come down below a threshold value $-E_1$ or a moment $t_4$ at which the amplitude has come to exceed another threshold voltage $E_1$. It is also possible to use the moment $t_5$ of the zero-cross point as the index of the propagation time. It is, however, to be noted that the induced voltage usually has a greater amplitude in its earlier half cycle than in the later half cycle thereof. From this point of view, it is preferable to use the moment $t_3$ or the moment $t_5$.

Induction voltage the same as that illustrated in FIG. 3 is obtained also when the position appointing bar magnet 7 is moved translationally in the direction perpendicular to the length of the magnetostrictive transmission medium elements 1a to 1d, i.e., in the Y-direction as viewed in FIG. 1 to locate the N-pole of the position appointing bar magnet 7 on one of the magnetostrictive transmission medium elements 1b to 1d. This is attributable to the fact that the coils 5a,5c have polarity reverse to that of the coils 5b,5d while the polarities of the biasing magnetic bodies 4a to 4d are opposite. Therefore, the voltage induced as a result of the magnetostrictive vibration is always constant, and the precision of detection can be enhanced advantageously. Furthermore, since the coils 5a,5c and coils 5b,5d are connected with opposite polarities, the voltages induced immediately after the moment $t_0$ in the X-direction second coils 5a to 5d by the X-direction first coil 2 can be negated by each other. It is thus possible to decrease the distance between the X-direction first coil 2 and the X-direction second coils 5 so that the detection of position can be made over greater area. This advantage can be obtained generally by connecting the second coil portions covering about a half part of the magnetostrictive transmission medium elements to the second coil portions covering the other half part with the opposite polarity.

It has been confirmed through experiments that, in the arrangement shown in FIG. 1, when the position appointing bar magnet 7 is on the magnetostrictive transmission medium element 1a, the polarity of the voltage induced by the magnetostrictive vibration wave is reversed by reversing the polarity of the position appointing bar magnet 7 or of the biasing bar magnet 4a, reversing the winding direction of the X-direction first coil 2 or the X-direction second coil 5, or reversing the polarity of the connection of the first coil 2 or the second coil 5.

Therefore, when the winding direction of the coils 5b,5d is opposite to that shown in FIG. 1, the inducted voltage can be picked up at the same polarity by reversing the polarity of the corresponding biasing bar magnets 4b,4d. In this case, however, the level of the voltage induced in the X-direction second coil 5 by the X-direction first coil 2 becomes negligibly high. It is also possible to connect the coils 5a to 5d in parallel, although the level of the induced voltage becomes lower. In the case where the zero-cross point $t_5$ is detected, the precision of detection is not so much affected even if the polarity of the induced voltage is changed for each of the magnetostrictive transmission medium elements 1a to 1d.

Figure 4:
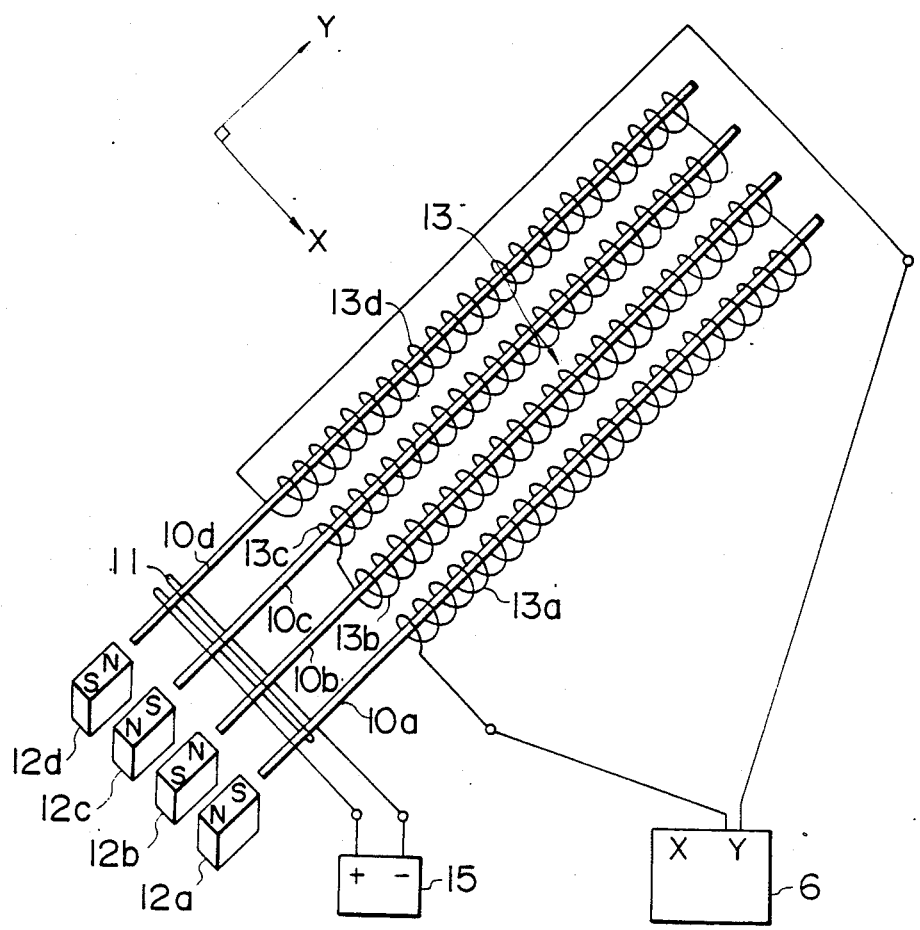
FIG. 4 is an illustration of a Y-direction position detecting section which is used in combination with the X-direction position detecting section.

FIG. 4 illustrates the construction of a Y-direction position detecting section which is used in combination with the X-direction position detecting section as shown in FIG. 1. Numerals 10a to 10d denote magnetostrictive transmission medium elements arranged substantially in parallel with one another to extend in the Y-direction, while a numeral 11 designates a Y-direction first coil wound around commonly one ends of the medium elements 10a to 10d, 15 denotes a Y-direction pulse current generator adapted to apply a pulse current to the Y-direction first coil 11 to generate magnetostrictive transmission medium elements 10a to 10d simultaneously, 12 to 12d denote biasing magnetic bodies adapted to apply a biasing magnetic field to the portions of the magnetostrictive transmission medium elements 10a to 10d surrounded by the Y-direction first coil 11, and 13a to 13d denote coils wound over large lengths of the magnetostrictive transmission medium elements 10a to 10d. These coils 13a to 13d are wound in the same direction which is in this case counterclockwise direction. Coils 13a and 13b are connected at their terminal ends, while the starting ends of the coils 13b and 13c are connected. The coil 13c is connected at its terminal end to the terminal end of the coil 13d. The starting ends of the coils 13a and 13d are connected to the Y-direction input terminal of the processing unit 6. Thus, as in the case of the X-direction position detecting section shown in FIG. 1, the coils 13a to 13d are connected in series such that adjacent coils exhibit reverse polarities to each other. The coils 13a to 13d constitute a Y-direction second coil 13.

As will be explained in detail hereinafter, the magnetostrictive transmission medium elements 10a to 10d surrounded by the Y-direction first coil 11 and the Y-direction coil 13 are superposed to the magnetostrictive transmission medium elements 1a to 1d surrounded by the X-direction first coil 2 and the X-direction second coil 5 shown in FIG. 5, as closely as possible to the elements 1a to 1d, and are used in the detection of the position appointed by the position appointing magnetism generator in the Y-direction. Any further explanation of the construction and operation of this Y-direction position detecting section will be unnecessary because they are materially identical to those of the X-direction position detecting section shown in FIG. 1

Figure 5:
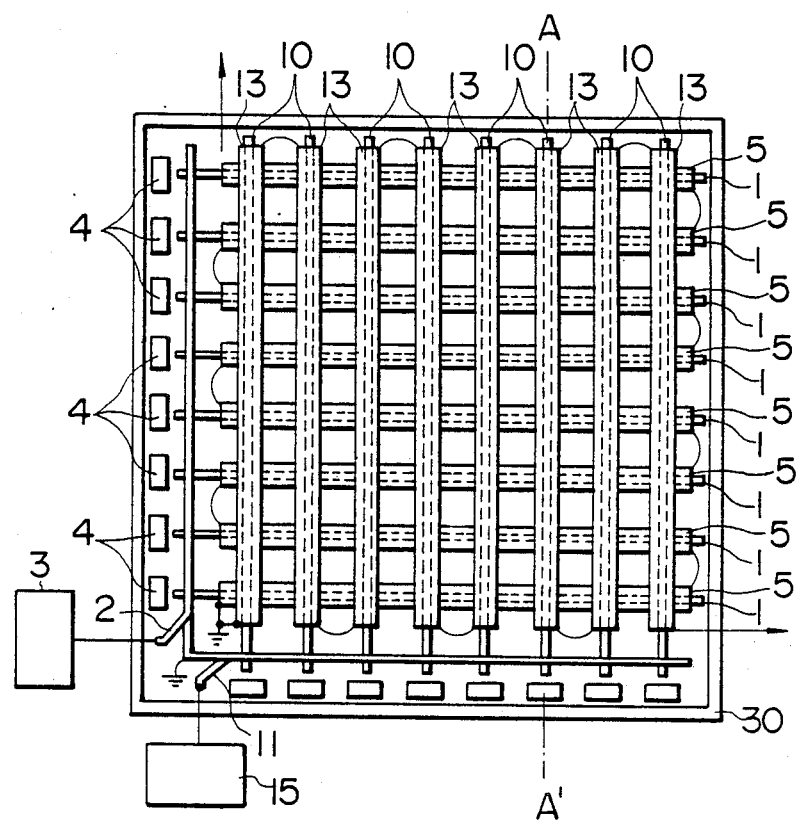
FIG. 5 is a partly cut-away plan view of an example of the detecting section of a position detecting apparatus.
Figure 6:
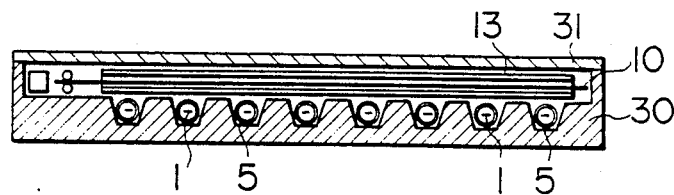
FIG. 6 is a sectional view of the detecting section taken along the line A—A' of FIG. 5.

FIG. 5 is a partly cut-away plan view of an example of the Y-direction detecting section of the position detecting apparatus of the invention, while FIG. 6 is a sectional view taken along the line A—A' thereof. As will be seen from these figures, the X-direction second coil 5 receiving the magnetostrictive transmission medium elements 1a to 1d is placed in a recess formed in the inner bottom surface of a housing 30 and the Y-direction second coil 13 receiving the medium elements 10a to 10d is superposed to the coil 5. These coils are fixed as desired by an adhesive. Since the apparatus of the invention makes use of the propagation of magnetostrictive vibration wave in the longitudinal vibration mode, it is preferred that the degree of freedom of movement of the magnetostrictive transmission medium elements 1a to 1d is not limited. One end of the X- and Y-direction first coils 2 and 11 is grounded while the other end is lead to the outside and connected to the X-direction pulse current generator 3 and the Y-direction pulse current generator 15. The X- and Y-direction second coils 5 and 13 are grounded at their one end while the other end is lead to the outside and connected to the processing unit 6.

The biasing magnetic bodies 4 are fixed in the recess formed in the inner bottom surface of the housing 30 so as to be opposite to the ends of the magnetostrictive transmission medium elements 1 and 10, although they may be disposed above, below or at a lateral side of the magnetostrictive transmission medium elements 1 and 10 in parallel with the latter. The housing 30 is covered by a lid 31 on which the position appointing bar magnet 7 moves.

Figure 7:
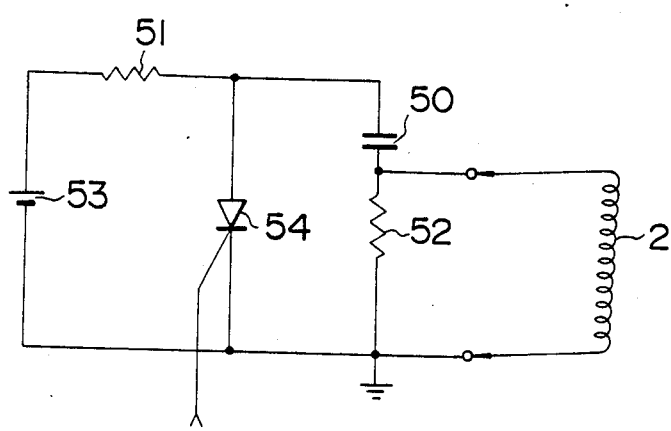
FIG. 7 is an electric circuit diagram of an example of a pulse current generator 3.

FIG. 7 is an electric circuit diagram of an example of the X-direction pulse current generator 3 and the Y-direction pulse current generator 15. The pulse current generator has a capacitor 50 which is adapted to be charged by a D.C. source 53 through resistors 51 and 52. A thyristor 54 is connected in parallel to the series connection of the capacitor 50 and the resistor 52. In operation, as the thyristor 54 is turned on, the capacitor 50 discharges through the thyristor 54 and the resistor 52 so that the voltage produced between both terminals of the resistor 52 is applied to the first coil 2. The thyristor 54 is adapted to be turned on when its gate receives a trigger pulse coming from the processing unit 6 shown in FIG. 1.

Figure 8:
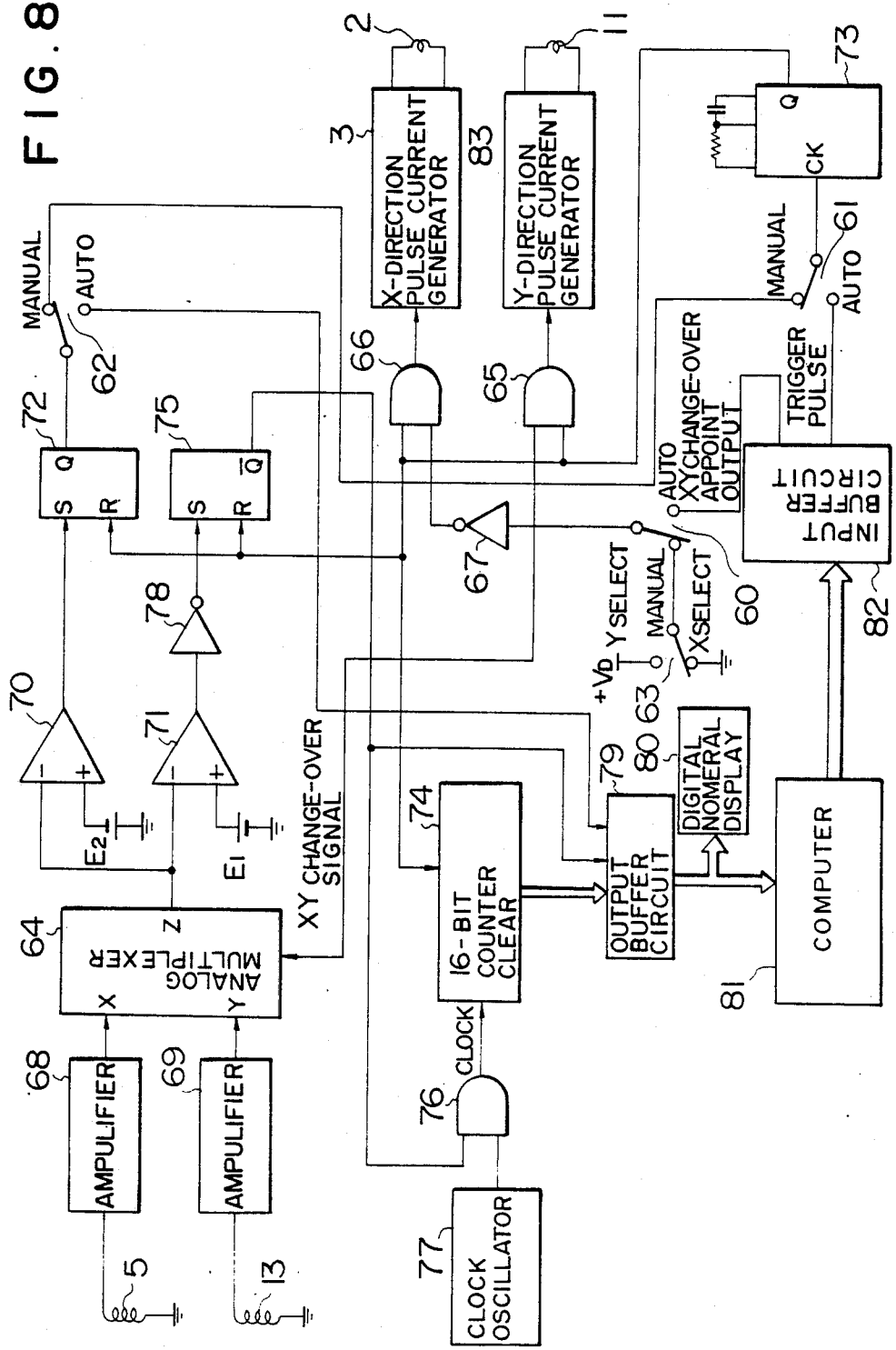
FIG. 8 is a block diagram of an essential part of an example of a processing unit 6.

FIG. 8 shows a block diagram of an essential part of an example of the processing unit 6.

Referring to this figure, change-over switches 60 to 62 are switches which are operatively connected to one another and adapted for switching the operation mode between the manual mode and the automatic mode. A change-over switch 63 is a switch for switching the operation between the detection of position in the X-direction and the detection of position in the Y-direction, respectively. The operation of the apparatus in each operation mode will be described hereinafter.

Manual Mode
(Position Detection in X-Direction)

As the change-over switch 63 is changed-over to the grounding side, the analog multiplexer 64 is switched for the X-direction position detecting operation, and an AND circuit 65 is closed while an AND circuit 66 is opened by the output from the inverter 67, thus enabling the direction of position in the X-direction.

Figure 9:
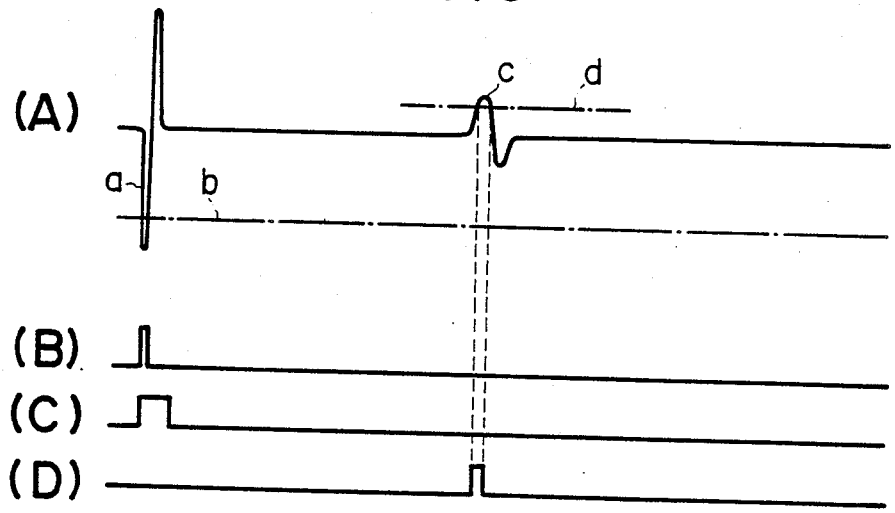
FIGS. 9(A), 9(B), 9(C) and 9(D) are an illustration explanatory of the operation of the part shown in FIG. 8

As the antenna coil 8 shown in FIG. 8 is excited while being moved close to the X-direction second coil 5 and the Y-direction second coil 13, large electromotive forces or voltages are induced in the X-direction second coil 5 and the Y-direction second coil 13 by the magnetic field generated by the antenna coil 8. These voltages are amplified by amplifiers 68 and 69, and are inputted to the comparators 70 and 71 through an analog multiplexer 64. The comparator 70 compares the voltage induced by the antenna coil 8 having a waveform as shown, for example, by a in FIG. 9A, with the threshold value (shown by b) produced by a D.C. voltage $E_2$, and produces an output "1" when the induced electromotive force is smaller than the threshold value. Consequently, the comparator 70 produces a pulse as shown in FIG. 9B.

An RS flip-flop circuit 72 is adapted to be set by a rise of the above-described output pulse from the comparator 70. A one-shot multivibrator 73 is adapted to be started by the rise of Q output from the RS flip-flop 72. The one-shot multivibrator 73 produces a pulse having a pulse width of about 10 u sec as shown in FIG. 9C, so as to clear a 16-bit counter 74 while resetting RS flip-flops 72 and 75. The Q output from the RS flip-flop 75 is inputted to the AND circuit 76 as a gate signal, so that the 16-bit counter 74 commences the counting of the output pulse from a clock oscillator 77. The frequency of this pulse signal is, for example, 100 MHZ. The output from the one-shot multivibrator 73 is delivered to the X-direction pulse current generator 3 as the trigger pulse through the AND circuit 66, so that a pulse current is applied to the X-direction first coil 2.

The electromotive force or voltage induced by the magnetostrictive vibration wave generated by the X-direction second coil 5 is amplified by the amplifier 68, and is delivered to comparators 70 and 71 through the analog multiplexer 64. Assuming here that the electromotive force inputted to the comparator 71 is as shown by a symbol C in FIG. 9A, the + input terminal of the comparator 71 receives a threshold value as indicated by d in FIG. 9A presented by the D.C. power source $E_1$. The comparator 71 produces an output of "0", when the output from the analog multiplexer 64 exceeds the threshold value d, i.e., when a positive part of the voltage induced by the magnetostrictive wave is detected.

The output from the comparator 71 sets the flip-flop 75 through the inverter 78. Therefore, the AND circuit 76 is closed by the Q output from the flip-flop 75, so that the 16-bit counter 74 stops its counting operation. Since the 16-bit counter 74 stops its counting operation when the voltage is induced in the X-direction second coil 5 by the magnetostrictive vibration wave, the counter 74 informs the time length after the delivery of the first trigger pulse, as a digital value. Since the magnetostrictive vibration wave propagates at a constant velocity of 5000 m, this time length corresponds to the distance in the X-direction between the X-direction first coil 2 and the position appointing magnetic body 7. The X-direction position data thus obtained in the form of a digital signal is inputted through an output buffer circuit 79 to a display device 80 for a digital display or to a computer 81 for processing.

(Y-direction Position Detection)

As the change-over switch 63 is switched to $+Vb$ side, the analog multiplexer 64 is switched to Y-input side, i.e., to the Y-direction second coil 13, while opening and closing the AND circuit 65 and the AND circuit 66, respectively. Consequently, the Y-direction pulse current generator 82 operates to permit the detection of Y-direction position, by the same processing as that in the detection of position in X-direction.

Automatic Mode

In the automatic mode of the operation, the change-over switches 60 to 62 have been switched to the AUTO, so that the computer 81 reads the output of the RS flip-flop 72 through the output buffer circuit 79. The computer 81 in this state is capable of delivering a starting pulse to the one-shot multivibrator 73 through an input buffer circuit 82, and controlling the states of the AND circuits 65,66, as well as the clearing state of the 16-bit counter 74.

Figure 10:
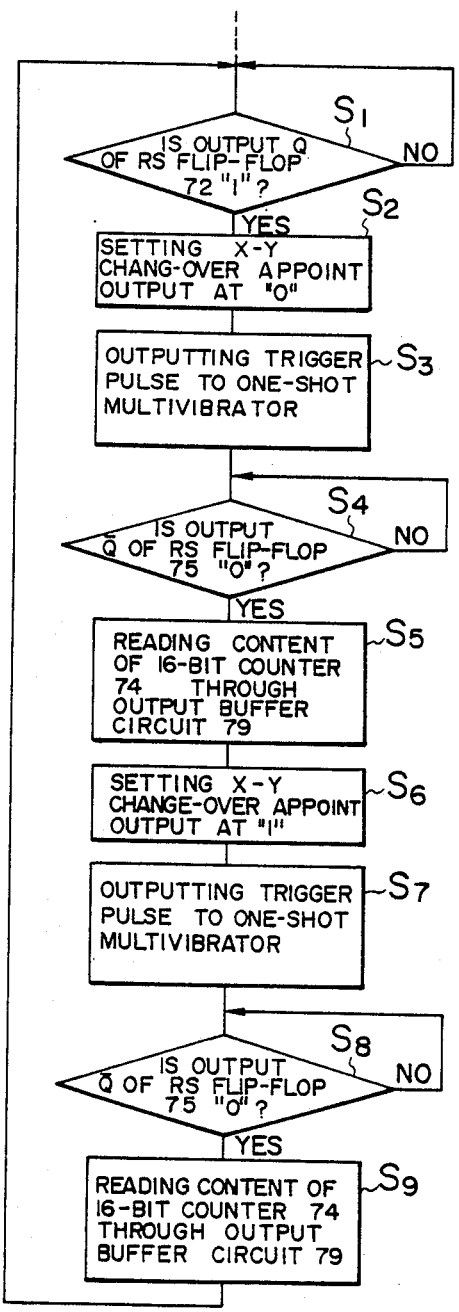
FIG. 10 is a flow chart of an example of a process executed by a computer 81.

FIG. 10 is a flow chart of a process performed by the computer 81 in the automatic mode. As will be seen from this figure, when the Q output from the RS flip-flop 72 is changed to "1" in a step S1, the computer 81 outputs an X-Y change-over appointing output "0" to the peripheral circuits through the input buffer circuit 82, while delivering a trigger pulse to the one-shot multivibrator 73, thereby initiating the measurement of the X-direction position in steps S2 and S3. The computer 81 then observes the Q output of the RS flip-flop 75 in a step S4, and reads the content of the 16-bit counter 74 through the output buffer circuit 79 when the Q output becomes "0" in a step S5, and stores the X-direction position in a memory or the like means which is not shown. Subsequently, in order to effect the detection of position in the Y-direction, the computer 81 changes the X-Y change-over appointing output to "1" in the step S6, and delivers a trigger pulse to the one-shot multivibrator 73 in a step S7. In a step S8, the computer 81 observes the Q output of the RS flip-flop 75 and, when the Q output is changed to "0", the computer 81 reads the content of the 16-bit counter 74 through the output buffer circuit 79 in a step S9.

In the arrangement shown in FIG. 10, the detection of position in the X-direction and the detection of position in the Y-direction are conducted consecutively. This, however, is not exclusive and the arrangement may be such that the position detection in X-direction and the position detection in Y-direction are conducted alternatingly at each time the output of the RS flip-flop 72 takes the "1" level.

Figure 11:
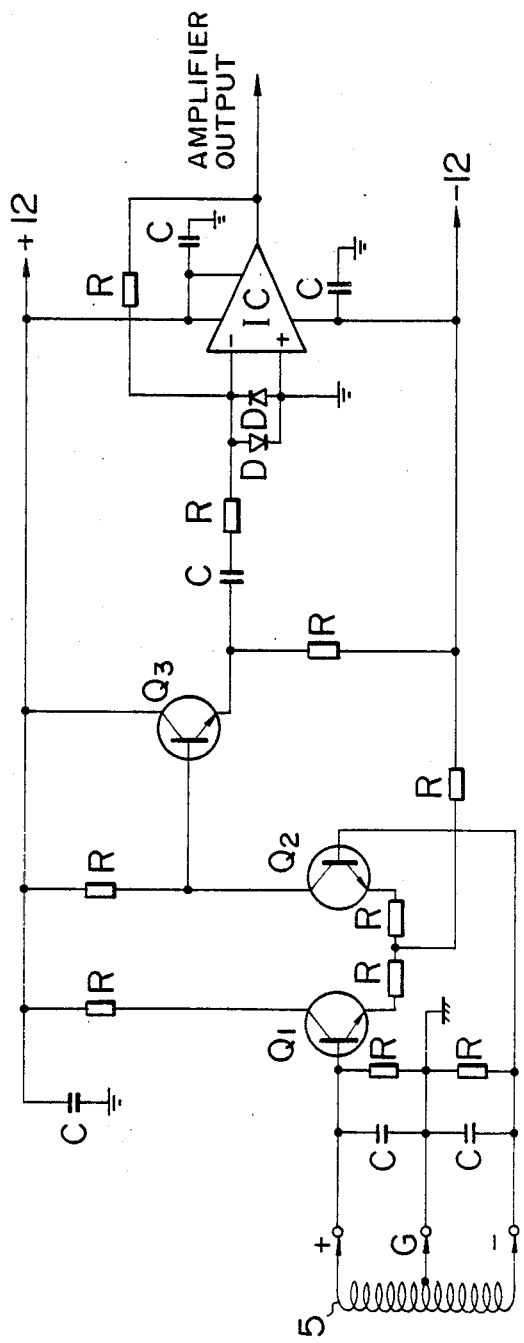
FIG. 11 is an electric circuit diagram of an example of an amplifier 68 incorporated in the circuit shown in FIG. 8.

FIG. 11 is an electric circuit diagram of the amplifier 68 as shown in FIG. 8. The amplifier 68 has transistors $Q_1$ to $Q_3$, an operation amplifier IC, a diode D, a resistor R and a capacitor C. The output from the X-direction second coil 5 is amplified by the differential amplifier constituted by transistors $Q_1$ and $Q_2$, and is delivered to the analog multiplexer 64 shown in FIG. 7 through an emitter-follower transistor $Q_3$. The amplifier 69 can have a construction similar to the amplifier 68.

Figure 12:
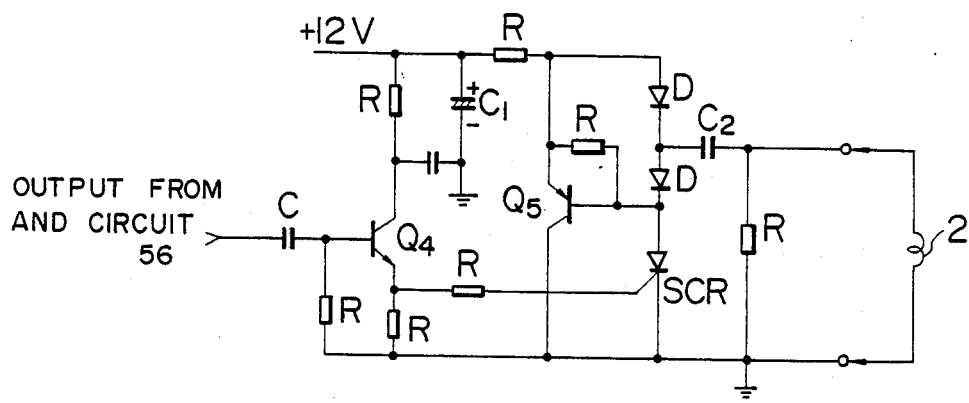
FIG. 12 is an electric circuit diagram of another example of the X-direction pulse current generator.

FIG. 12 is an electric circuit diagram of another example of the X-direction pulse current generator 3. Symbols $Q_4,Q_5$ represents transistors, SCR represent a thyristor, and $C_1,C_2$ represent capacitors. As the transistor $Q_4$ is turned on by the output pulse from the AND circuit shown in FIG. 7, the trigger pulse is applied to the gate of the SCR so that the thyristor SCR turns on, whereby the charge stored in the capacitor $C_2$ is applied to the X-direction first coil 2 through the thyristor SCR.

Figure 13:
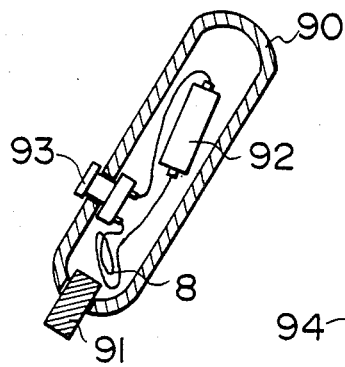
FIG. 13 is a sectional view of an example of a position appointing magnetism generator.
Figure 14:
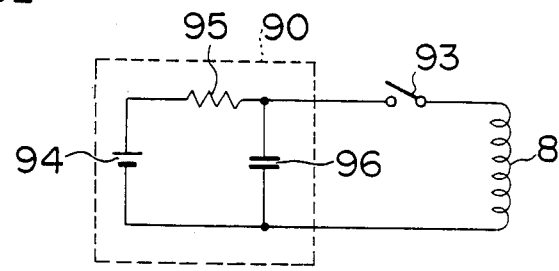
FIG. 14 is an electric circuit diagram.
Figure 15:
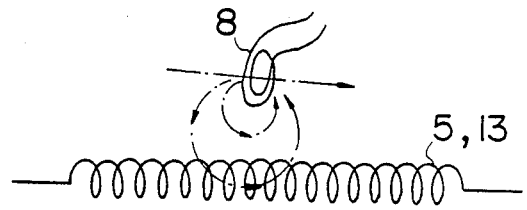
FIG. 15 is an illustration explanatory of the operation of the magnetism generator shown in FIG. 13.

FIG. 13 is a sectional view of a position appointing magnetism generator. FIGS. 14 and 15 are an electric circuit diagram and an illustration of the operation of the magnetism generator, respectively.

This position appointing magnetism generator has a magnetic body 91 attached to the end of a pen-shaped vessel 90, with a charger 92 incorporated therein. One end of the charger 92 is connected to one of the terminals of an operation switch 93 while the other end of the same is connected to one end of the antenna coil 8. The other end of the antenna coil 8 is connected to the other terminal of the operation switch 93. The operation switch 93 is attached to one side surface of the vessel 90 so that it can be manipulated from the outside of the vessel 90. As the operation switch 93 is turned on, the electric charge stored in the discharging capacitor 96 by the D.C. power source 94 through a current-limiting resistor 95 is discharged through the antenna coil 8 and attenuates in the form of a vibration current at a time constant which is determined by the capacitor 96 and the antenna coil 8. In this state, since X- and Y-direction second coils 5 and 13 are arranged in a lattice-like form in the vicinity of the surface of the position detecting apparatus, voltages are induced in the second coils 5 and 13 through an electromagnetic induction by the magnetic field produced by the antenna coil 8. As explained before in connection with FIG. 8, these induced voltages are separated from the voltages induced by the magnetostrictive vibration wave, to detect the timing at which the operation switch 93 is turned on. While the voltage induced by the magnetostrictive vibration wave is on the order of several to several tens of mV, the voltage induced by the antenna coil 8 takes a much higher level of several hundreds of mV or higher. It is, therefore, possible to select only the voltage induced by the antenna coil 8, by employing different threshold levels for the comparators 70 and 71 as explained before.

By providing the position appointing magnetism generator with an antenna coil 8 as shown in FIG. 13, the operator can know whether the position data is the desired one or not, without using any cord. However, the position appointing magnetism generator used in the invention need not always have the antenna, as will be understood by those skilled in the art from the principle of the invention.

Figure 16:
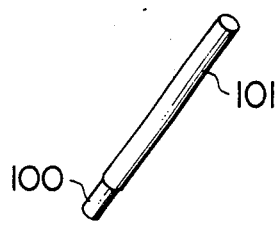
FIG. 16 is a perspective view of another example of the position appointing magnetism generator.

FIG. 16 is a perspective view showing another example of the position appointing magnetism generator. This generator has a cylindrical magnetic body 100 attached to one end of a pen-shaped elongated vessel 101. The cylindrical magnetic body 90 may have comparatively small or large axial length.

Figure 17:
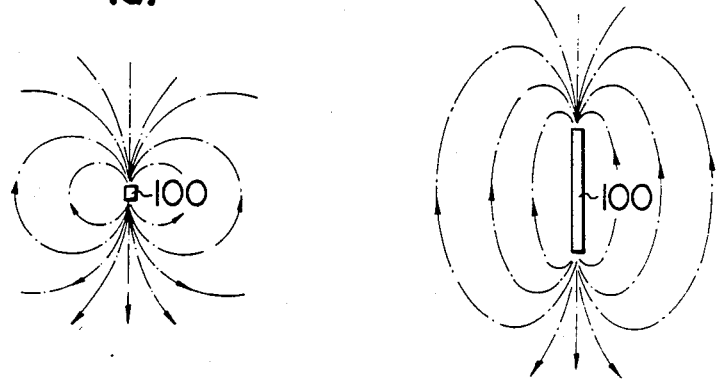
FIGS. 17(a) and 17(b) are an illustration showing the distribution of magnetic lines of force on a cylindrical magnetic member 100.
Figure 18:
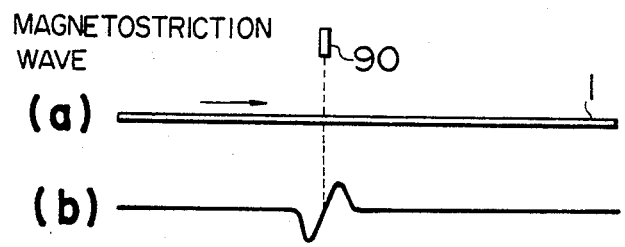
FIGS. 18(a) and 18(b) are an illustration of the relationship between the magnetostrictive vibration wave and the position appointing magnetism generator.

FIG. 17(a) shows the distribution of magnetic lines of force on the short cylindrical magnetic body, while FIG. 17(b) shows that on the long cylindrical magnetic body. In this example, the cylindrical magnetic body 100 is disposed at a right angle to the magnetostrictive transmission medium elements 1 as shown in FIG. 18(a) so that the polarity of magnetic field parallel to the magnetostrictive medium elements 1a to 1 resulted by the movement of the magnetostrictive vibration wave toward and away from the cylindrical magnetic body 100 is opposite to that obtained when the vibration wave moves away from the same. In consequence, the polarity of the voltage induced by the magnetostrictive vibration caused in the second coil is reversed when the vibration wave passes the position just under the cylindrical magnetic body 100 as shown in FIG. 18(b).

Figure 19:
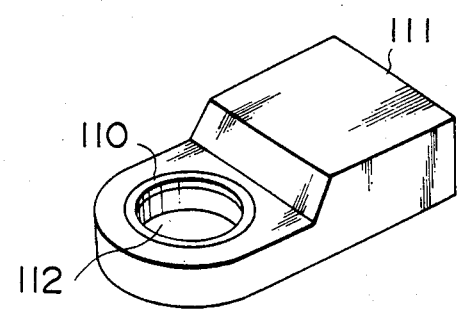
FIG. 19 is a perspective view of another example of the position appointing magnetism generator.

FIG. 19 is a perspective view of still another example of the position appointing magnetism generator. This generator has a ring-shaped magnetic body 110 horizontally and fixedly received by a through bore 112 formed in a cursor 111 having a flat bottom. The ring-shaped magnetic body 110 exhibits a distribution of magnetic lines of force substantially equivalent to that of a cylindrical magnetic body positioned on the central axis of the ring-shaped magnetic body and, therefore, can be used as the position appointing magnetism generator. The ring-shaped magnetic body 110 may be magnetized either vertically or horizontally. The ring-shaped magnetic body 110 magnetized horizontally can be suitably used in the close proximity of the magnetostrictive transmission medium elements 1a to 1d, while the vertically magnetized ring-shaped magnetic body is suitable for use at a position comparatively remote from the medium elements 1. When an antenna coil 8 is provided, it is mounted in the cursor 111.

Figure 20:
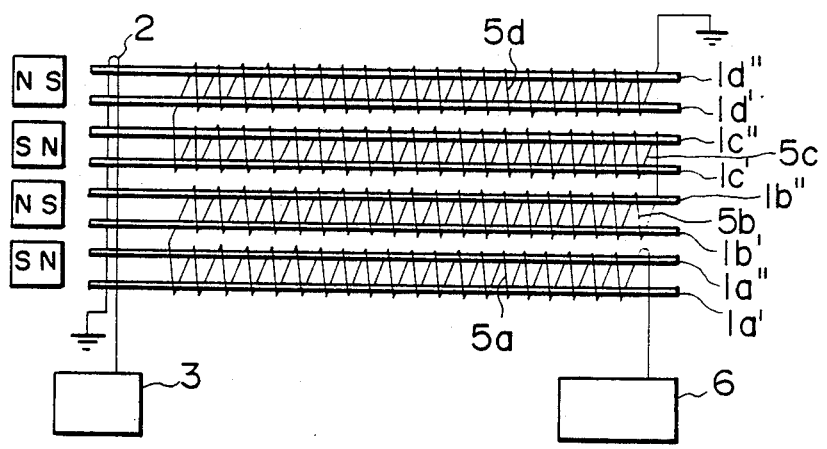
FIG. 20 is an illustration of another embodiment.

FIG. 20 shows the construction of an essential part of another embodiment. In this embodiment, each of the coils 5a to 5d receives two parallel magnetostrictive transmission mediums 1a' to 1d' and 1a'' to 1d'' so as to constitute the X-direction position detecting section. Other portions are substantially identical to those shown in FIG. 1. At least one magnetostrictive transmission medium element received by each of the coils 5a to 5d will be referred to as "magnetostrictive line bundle" in this specification.

FIG. 21a is a plan view of another example of the position detecting section, while FIGS. 21b and 21c are sectional views taken along the lines A—A' and B—B' of FIG. 21a, respectively.

In these figures, a reference numeral 200 designates 24 (twenty-four) magnetostrictive medium elements extending in the Y-direction. A Y-direction first coil 201 of single turn is wound around one end of the medium elements 200. A Y-direction second coil 202 is wound around the portion where the first coil 201 is provided. The Y-direction first coil 201 has a tabular lower electrode and a linear upper electrode. In order to obtain a high precision of position detection, it is preferred that the magnetostrictive vibration wave is produced at the same position of all magnetostrictive transmission medium elements 200. If both electrodes are linear, it is necessary to locate these electrodes at a high precision. However, the tabular electrode does not require such a high precision of location, provided that the other electrode is, i.e., the linear electrode. This is the reason why one of the electrodes is tabular in this embodiment. A plurality of biasing magnetic bodies 203 having the illustrated polarities are disposed near the portions of the Y-direction first coil 201. The Y-direction first coil 201 is connected to a Y-direction pulse generator which is not shown.

The Y-direction second coil 202 has portions surrounding 6 (six) magnetostrictive transmission medium elements. These portions are connected in series and these series connections are connected in parallel. The parallel connection is connected to a processing unit which is not shown.

The same arrangement applies also to the Y-direction. Namely, a single turn of X-direction first coil 205 is wound around one end of 24 (twenty-four) magnetostrictive transmission medium elements 204 extended in the X-direction, and an X-direction second coil 206 is wound round a portion slightly spaced from the portion where the first coil 205 is wound. A plurality of biasing magnetic bodies 207 are provided.

Figure 21:
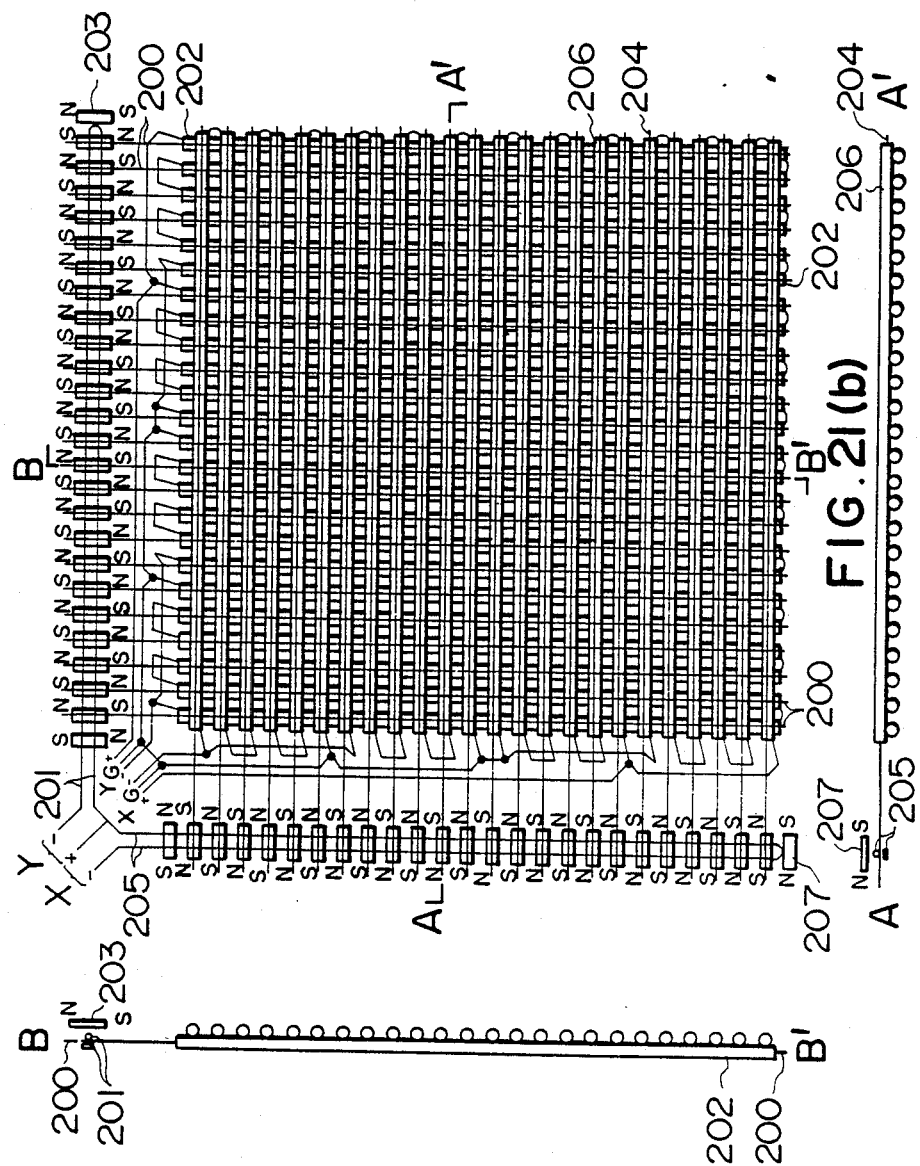
FIGS. 21(a), 21(b) and 21(c) are a partly cut-away plan view of another example of the detecting section of the position detecting apparatus.
Figure 22:
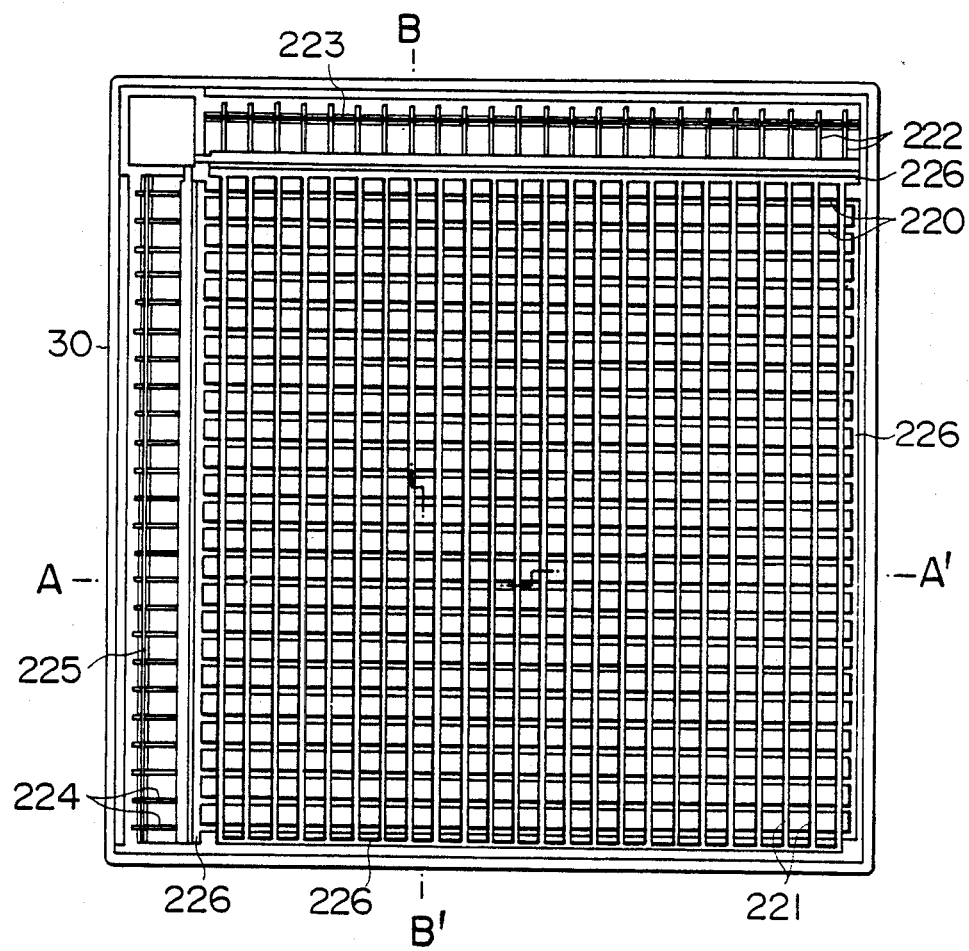
FIGS. 22(a), 22(b) and 22(c) are an illustration of a housing for accommodating the position detecting section as shown in FIG. 21.

FIG. 22a is a plan view of an example of a housing which receives the position detecting section shown in FIG. 21, while FIGS. 22b and 22c are sectional views taken along the lines A—A' and B—B' of FIG. 22a. There are 24 grooves 220 extended transversely of the plane of the drawing for receiving the X-direction second coil 206. There are provided also 24 deeper grooves 221 extended in the vertical direction as viewed in the plane of the drawing, for receiving the Y-direction second coil 202. Vertically extending 24 grooves 222 are provided for receiving the Y-direction magnetostrictive transmission medium elements 200, while narrower grooves 223 perpendicular to the grooves 222 are guide grooves for receiving linear electrodes of the Y-direction first coil 201. Similarly, at the left portion of the housing are formed 24 grooves 224 for receiving the X-direction magnetostrictive transmission medium elements 204 and grooves 225 for receiving the linear electrodes of the X-direction first coil 205. A suitable space 226 is formed at the ends of the grooves 220, 224 so as to receive the lines through which the adjacent portions of the coils are connected. This housing can be molded integrally from a resin such as ABS resin. The assembling is completed by fitting a cover (not shown) to the housing, after placing the construction shown in FIG. 21 in the housing.

In the embodiments described hereinbefore, X- and Y-direction second coils having a large number of turns are used for the detection of the magnetostrictive vibration wave, so that a large electromotive force is produced by the magnetostrictive vibration wave. This permits a corresponding reduction in the pulse voltage applied to the X- and Y-direction first coils, so that it becomes possible to simplify the circuit while saving energy. As stated before in connection with the principle of the invention, however, the construction of the described embodiments may be modified such that the X- and Y-direction second coils are connected to the X- and Y-direction pulse current generators 3 and 15 to serve as the source of the magnetostrictive vibration wave, while connecting the X- and Y-direction first coils to the processing unit 6 so as to make them serve as the coils for detecting the magnetostrictive vibration wave.

As will be understood from the foregoing description, the position detecting apparatus of the invention can find various uses, such as a device for inputting a pattern data or the like to a computer. It is also possible to use the apparatus of the invention for automatically detecting the position of a moving object. In such a use, the position appointing magnetism generator is attached to the moving object, while the magnetostrictive transmission medium element is disposed along the path of travel of the moving object.

Although the invention has been described through specific terms, it is to be noted here that the described embodiments are not exclusive and various changes and modifications may be imparted thereto without departing from the scope of the invention which is limited solely by the appended claims.

What is claimed is:

1. A position detecting apparatus comprising:
   a plurality of substantially parallel X-direction magnetostrictive line bundles, each of said bundles having at least one magnetostrictive transmission medium element;
   a plurality of substantially parallel Y-direction magnetostrictive line bundles, each of said bundles having at least one magnetostrictive transmission medium element, said Y-direction magnetostrictive line bundles crossing said X-direction magnetostrictive line bundles substantially at a right angle;
   a first coil constituted by an X-direction first coil wound commonly around one end of said X-direction magnetostrictive line bundles and a Y-direction first coil wound commonly around one end of said Y-direction magnetostrictive line bundles;
   a second coil constituted by an X-direction second coil having portions wound around said X-direction magnetostrictive line bundles over a large length thereof, said portions being connected in series or parallel, and a Y-direction second coil having portions wound around said Y-direction magnetostrictive line bundles over a large length thereof, said portions being connected in series or parallel;
   a pulse current generator for applying a pulse current to one of said second or first coils to cause a magnetostrictive vibration wave in each of said magnetostrictive transmission medium elements; and
   a processing unit for detecting the time length from a moment at which said magnetostrictive vibration wave is generated until a moment at which an induced voltage appears in the other of said first and second coils.

2. A position detecting apparatus according to claim 1, wherein said pulse current generator includes an X-direction pulse current generator for applying a pulse current to said first X-direction first coil and a Y-direction pulse current generator for applying a pulse current to said Y-direction first coil; while said processing unit includes an X-direction position detecting means for detecting the time length from the moment at which said magnetostrictive vibration wave is generated in said X-direction magnetism line bundles until a moment at which a voltage induced by said magnetostrictive vibration wave appears in said X-direction second coil, and a Y-direction position detecting means for detecting the time length from the moment at which said magnetostrictive vibration wave is generated in said Y-direction magnetism line bundles until a moment at which a voltage induced by said magnetostrictive vibration wave appears in said Y-direction second coil.

3. A position detecting apparatus according to claim 1, wherein said pulse current generator includes an X-direction pulse current generator for applying a pulse current to said second X-direction second coil and a Y-direction pulse current generator for applying a pulse current to said Y-direction second coil; while said processing unit includes an X-direction position detecting means for detecting the time length from the moment at which said magnetostrictive vibration wave is generated in said X-direction magnetism line bundles until a moment at which a voltage induced by said magnetostrictive vibration wave appears in said X-direction first coil, and a Y-direction position detecting means for detecting the time length from the moment at which said magnetostrictive vibration wave is generated in said Y-direction magnetism line bundles until a moment at which a voltage induced by said magnetostrictive vibration wave appears in said Y-direction first coil.

4. A position detecting apparatus comprising:

a plurality of substantially parallel X-direction magnetostrictive line bundles, each of said bundles having at least one magnetostrictive transmission medium element;

a plurality of substantially parallel Y-direction magnetostrictive line bundles, each of said bundles having at least one magnetostrictive transmission medium element, said Y-direction magnetostrictive line bundles crossing said X-direction magnetostrictive line bundles substantially at a right angle;

a first coil constituted by an X-direction first coil wound commonly around one end of said X-direction magnetostrictive line bundles and a Y-direction first coil wound commonly around one end of said Y-direction magnetostrictive line bundles;

a second coil constituted by an X-direction second coil having portions wound around said X-direction magnetostrictive line bundles over a large length thereof, said portions being connected in series or parallel, and a Y-direction second coil having portions wound around said Y-direction magnetostrictive line bundles over a large length thereof, said portions being connected in series or parallel;

a pulse current generator for applying a pulse current to one of said second or first coils to cause a magnetostrictive vibration wave in each magnetostrictive transmission medium element;

a processing unit for detecting the time length from a moment at which said magnetostrictive vibration wave is generated until a moment at which an induced voltage appears in the other of said first and second coils; and a plurality of biasing magnetic bodies for applying biasing magnetic fields to the portions of said magnetostrictive line bundles surrounded by said first coil; the winding directions of said X- and Y-direction second coils, connection polarities of the portions of said X- and Y-direction second coils and the polarities of said biasing magnetic bodies are so selected as to minimize the level of voltage directly induced in one of said first and second coils by the pulse current applied to the other of said first and second coils.

5. A position detecting apparatus according to claim 4, wherein said pulse current generator includes an X-direction pulse current generator for applying a pulse current to said first X-direction first coil and a Y-direction pulse current generator for applying a pulse current to said Y-direction first coil; while said processing unit includes an X-direction position detecting means for detecting the time length from the moment at which said magnetostrictive vibration wave is generated in said X-direction magnetism line bundles until a moment at which a voltage induced by said magnetostrictive vibration wave appears in said X-direction second coil, and a Y-direction position detecting means for detecting the time length from the moment at which said magnetostrictive vibration wave is generated in said Y-direction magnetism line bundles until a moment at which a voltage induced by said magnetostrictive vibration wave appears in said Y-direction second coil.

6. A position detecting apparatus according to claim 4, wherein said pulse current generator includes an X-direction pulse current generator for applying a pulse current to said second X-direction second coil and a Y-direction pulse current generator for applying a pulse current to said Y-direction second coil; while said processing unit includes an X-direction position detecting means for detecting the time length from the moment at which said magnetostrictive vibration wave is generated in said X-direction magnetism line bundles until a moment at which a voltage induced by said magnetostrictive vibration wave appears in said X-direction first coil, and a Y-direction position detecting means for detecting the time length from the moment at which said magnetostrictive vibration wave is generated in said Y-direction magnetism line bundles until a moment at which a voltage induced by said magnetostrictive vibration wave appears in said Y-direction first coil.

* * * * *

UNITED STATES PATENT AND TRADEMARK OFFICE
CERTIFICATE OF CORRECTION

PATENT NO. : 4,658,373
DATED : April 14, 1987
INVENTOR(S) : Azuma Murakami, et al.

It is certified that error appears in the above-identified patent and that said Letters Patent is hereby corrected as shown below:

Column 3, line 58, after "length" delete "by a coil".

Column 11, line 12, change "represents" to --represent-- and change "represent" to --represents--.

Signed and Sealed this

First Day of December, 1987

Attest:

DONALD J. QUIGG

Attesting Officer

Commissioner of Patents and Trademarks